United States Patent
Lang

(10) Patent No.: US 11,590,843 B2
(45) Date of Patent: Feb. 28, 2023

(54) METHOD AND CONTROL UNIT FOR OPERATING A DRIVETRAIN OF A MOTOR VEHICLE COMPRISING A POWER TAKE-OFF

(71) Applicant: ZF Friedrichshafen AG, Friedrichshafen (DE)

(72) Inventor: Ulf Lang, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 159 days.

(21) Appl. No.: 17/076,348

(22) Filed: Oct. 21, 2020

(65) Prior Publication Data
US 2021/0114456 A1  Apr. 22, 2021

(30) Foreign Application Priority Data

Oct. 22, 2019  (DE) .................. 10 2019 216 211

(51) Int. Cl.
*B60W 10/11* (2012.01)
*B60K 25/06* (2006.01)
(Continued)

(52) U.S. Cl.
CPC .......... *B60K 25/06* (2013.01); *B60W 10/024* (2020.02); *B60W 10/026* (2013.01);
(Continued)

(58) Field of Classification Search
CPC ......... B60K 17/28; B60K 25/02; F16H 59/14; F16H 2059/147; B60W 10/026;
(Continued)

(56) References Cited

U.S. PATENT DOCUMENTS 5,522,778 A * 6/1996 Iwase .................... F16H 61/143
477/65
5,582,069 A * 12/1996 Genise .................. B60W 10/30
74/335
(Continued)

FOREIGN PATENT DOCUMENTS

DE           195 04 935 A1    8/1985
DE     11 2008 000 312 T5    3/2010
(Continued)

OTHER PUBLICATIONS

German Search Report Corresponding to 10 2019 216 212.6 dated Apr. 17, 2020.

(Continued)

*Primary Examiner* — Roger L Pang
(74) *Attorney, Agent, or Firm* — Finch & Maloney PLLC

(57) ABSTRACT

A method for operating a motor vehicle drivetrain having a transmission connected between a drive aggregate and a drive output, a Power Take-Off (PTO) that can be coupled to the drive aggregate on drive aggregate side to take up drive torque from the drive aggregate. In order to determine the torque taken up by the PTO, the transmission is first shifted to interrupt torque to the transmission output. Thereafter, a defined torque is delivered by the drive aggregate, at least with the PTO coupled to the drive aggregate, and, during this at defined time-points, rotational speeds of a shaft driven by the drive aggregate are determined and from this an angular acceleration of the shaft is determined. A first torque of the shaft is determined from the shaft angular acceleration while the PTO is coupled. Based on the first torque, the torque taken up by the PTO is determined.

10 Claims, 1 Drawing Sheet

(51) Int. Cl.
 *B60W 10/02* (2006.01)
 *B60W 30/19* (2012.01)

(52) U.S. Cl.
 CPC ............ *B60W 10/11* (2013.01); *B60W 30/19* (2013.01); *B60W 2510/0266* (2013.01); *B60W 2510/0275* (2013.01); *B60W 2510/0652* (2013.01); *B60W 2510/1015* (2013.01); *B60W 2710/024* (2013.01); *B60W 2710/0666* (2013.01); *B60W 2710/1005* (2013.01)

(58) Field of Classification Search
 CPC ................. B60W 10/11; B60W 30/19; B60W 2510/0266; B60W 10/06; B60W 2510/0638; B60W 2510/0652; B60W 2510/1015; B60W 2710/024; B60W 2710/0666; B60W 2710/1005; B60W 2510/101; B60W 2510/305
 USPC .......................................................... 477/77
 See application file for complete search history.

(56) References Cited

U.S. PATENT DOCUMENTS

| | | |
|---|---|---|
| 6,386,351 B1 | 5/2002 | Salecker et al. |
| 8,540,606 B2 | 9/2013 | Livshiz et al. |
| 9,903,299 B2 * | 2/2018 | Homant .............. F02D 41/0097 |
| 2008/0194383 A1 * | 8/2008 | Berglund .............. B60W 30/19 |
| | | 477/97 |

FOREIGN PATENT DOCUMENTS

| | | |
|---|---|---|
| DE | 10 2010 051 221 A1 | 6/2011 |
| DE | 10 2013 204 652 A1 | 9/2014 |
| DE | 10 2017 113 876 A1 | 12/2017 |
| WO | 2007/030070 A1 | 3/2007 |
| WO | WO-2008094115 A1 * | 8/2008 ............ B60K 25/06 |
| WO | 2014/139960 A1 | 9/2014 |

OTHER PUBLICATIONS

German Search Report Corresponding to 10 2019 216 211.8 dated Apr. 15, 2020.

* cited by examiner

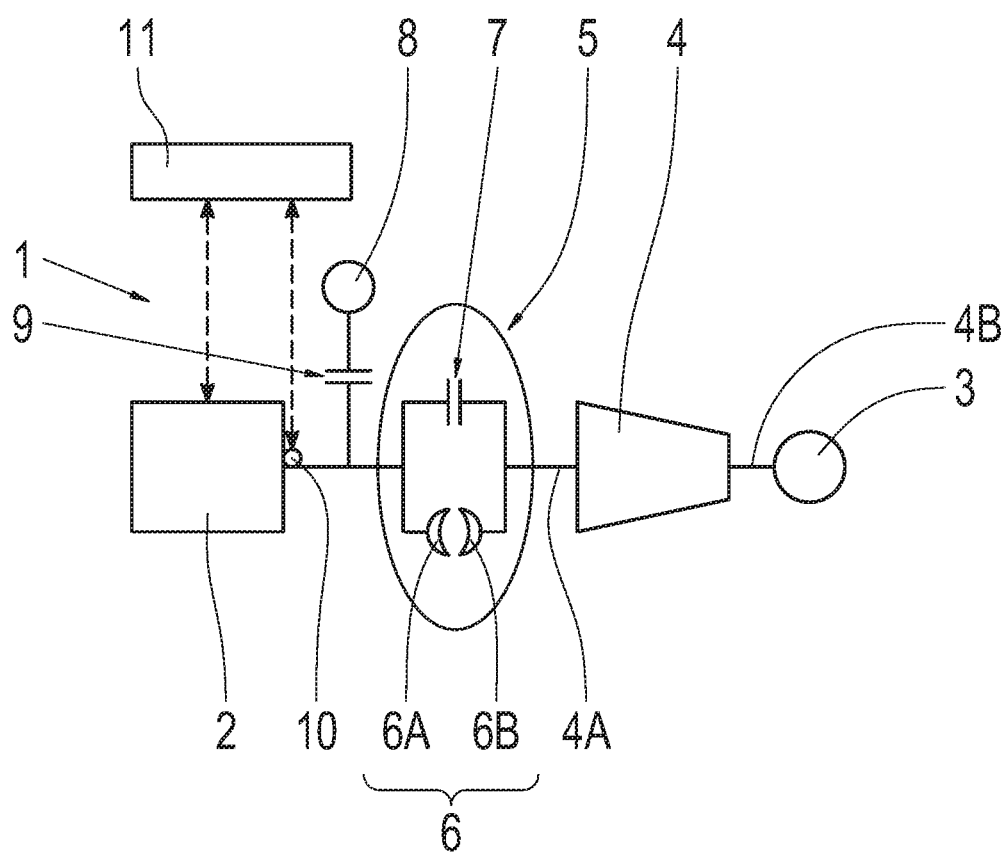

METHOD AND CONTROL UNIT FOR OPERATING A DRIVETRAIN OF A MOTOR VEHICLE COMPRISING A POWER TAKE-OFF

This application claims priority from German patent application serial no. 10 2019 216 211.8 filed Oct. 22, 2019.

FIELD OF THE INVENTION

The invention relates to a method for operating a drivetrain with a power take-off that can be coupled on the drive aggregate. In addition the invention relates to a control unit for operating a drivetrain.

BACKGROUND OF THE INVENTION

A drivetrain of a motor vehicle comprises a drive aggregate and a transmission connected between the drive aggregate and a drive output. The transmission is preferably an automatic or automated transmission, in which gear changes and thus shifts are carried out automatically or in an automated manner. Between the drive aggregate and the transmission, a hydrodynamic starting element can be connected, which then comprises a converter and a converter lock-up clutch connected parallel to the converter.

From WO 2007/030070 A1 a drivetrain of a motor vehicle is known, which comprises an auxiliary drive. Such an auxiliary drive is also known as a PTO (Power Take-Off). When the power take-off is coupled, the power take-off draws or takes up torque from the drive aggregate so that then less torque is available at the transmission and hence at the drive output. If shifts are to be carried out reliably in the transmission, then when the power take-off is coupled it is important to know how much torque is taken up by the power take-off. Until now it has been difficult to determine in a simple and reliable manner the torque taken up by a power take-off that can be coupled on the drive aggregate side.

SUMMARY OF THE INVENTION

Starting from there, the purpose of the present invention is to provide a new type of method for operating a drivetrain with a power take-off that can be coupled on the drive aggregate side, and a control unit for operating such a drivetrain.

That objective is achieved by a method for operating a drivetrain according to the independent claim (s).

According to the invention, to determine a torque taken up by the power take-off the transmission is first shifted to a condition in which the transmission, relative to an output thereof, is torque-interrupted and in which, preferably relative to an input of the transmission, a mass moment of inertia of the transmission is as large as possible.

Then, according to the invention a defined torque is delivered by the drive aggregate, namely at least when the power take-off is coupled to the drive aggregate, and during this at defined points in time rotational speeds of a shaft driven by the drive aggregate are determined, so that from the rotational speeds an angular acceleration of the shaft is determined. From the angular acceleration of the shaft when the power take-off is coupled to the drive aggregate a first torque of the shaft driven by the drive aggregate is determined, and as a function of the first torque of the shaft the torque taken up by the power take-off is determined.

With this invention it is proposed that to determine or ascertain the torque taken up by the power take-off, the transmission is first shifted to a defined condition in which no torque can be transmitted to the drive output. In such a condition of the transmission the drive aggregate is operated in such manner that it delivers a defined motor torque. At least when the power take-off is coupled to the drive aggregate, at defined time-points after the beginning of the delivery of the defined torque by the drive aggregate in each case a rotational speed of a shaft driven by the drive aggregate is determined, and from those rotational speeds an angular acceleration of the shaft is determined. From the angular acceleration of the shaft a first torque of the shaft can then be determined, and depending on this first torque of the shaft the torque taken up by the power take-off is determined. This can be done simply and reliably.

Preferably, the defined torque is also delivered by the drive aggregate when the power take-off is decoupled from the drive aggregate, so that an angular acceleration of the shaft is also determined when the power take-off is decoupled. This angular acceleration with the decoupled power take-off is determined from the rotational speeds of the shaft driven by the drive aggregate at the defined time-points after the beginning of the delivery of the defined torque. From the angular acceleration of the shaft with the power take-off decoupled from the drive aggregate, a second torque of the shaft is determined and as a function of the first and second torques the torque taken up by the power take-off is determined. This further development is preferred for determining the torque taken up by the power take-off as a function of the first torque at the shaft driven by the drive aggregate when the power take-off is coupled, and of the second torque at the shaft driven by the drive aggregate when the power take-off is decoupled.

Preferably, shifts in the transmission are carried out as a function of the torque taken up by the power take-off. In this way shifts in the transmission can be carried out particularly comfortably.

The control unit according to the invention is defined in the independent claim(s).

BRIEF DESCRIPTION OF THE DRAWINGS

Preferred further developments emerge from the subordinate claims and from the description that follows. Example embodiments of the invention, to which it is not limited, will be described in greater detail with reference to the sole drawing.

The sole drawings shows a schematic illustration of an example drivetrain of a motor vehicle.

DETAILED DESCRIPTION OF THE PREFERRED EMBODIMENTS

The sole drawing illustrates very schematically a drivetrain 1 of a motor vehicle. The drivetrain 1 comprises a drive aggregate 2 and a transmission 4 connected between the drive aggregate 2 and a drive output 3. The transmission 4 is an automatic or automated transmission in which gear changes and hence shifts are carried out automatically or in an automated manner.

In the example embodiment of the drivetrain 1 shown in the sole drawing, a hydrodynamic starting element 5 is connected between the drive aggregate 2 and the transmission 4. This comprises a converter 6 and a converter lock-up clutch 7 connected parallel to the converter 6. The converter comprises a pump wheel 6A and a turbine wheel 6B. The hydrodynamic starting element 5 is an optional assembly of the drivetrain 1.

In addition the sole drawing shows an auxiliary drive 8 that can be coupled on the drive aggregate side. Such an auxiliary drive 8 is also called a Power Take-Off (PTO). Depending on the state of a clutch 9, the power take-off 8 is either coupled to the drive aggregate 2 or decoupled from it.

When the clutch 9 is closed, the power take-off 8 is coupled to an output shaft of the drive aggregate 2, to which in the example embodiment shown the pump wheel 6A of the converter 6 is also coupled. On the other hand, when the clutch 9 is open the power take-off 8 is decoupled from the drive aggregate 2.

To determine the torque which the power take-off 8, that can be coupled on the drive aggregate side, takes up when the clutch 9 is closed, i.e. in the condition in which the power take-off 8 is coupled to the drive aggregate 2, in the context of the invention the transmission 4 is first shifted to a defined condition.

In this defined condition, relative to an output 4B of the transmission 4 the transmission 4 is torque-interrupted. In such a case, if a torque delivered by the drive aggregate 2 is applied at the input 4A of the transmission 4, no torque is transmitted toward the output 4B and thus in the direction of the drive output 3.

Furthermore, in this defined condition of the transmission 4, relative to an input 4A of the transmission 4, a mass moment of inertia of the transmission 4 is preferably as large as possible.

After the transmission 4 has been shifted to such a condition, a defined torque is delivered by the drive aggregate 2, namely at least when the power take-off 8 is coupled to the drive aggregate 2. During this, at defined time-points after the beginning of the delivery of the defined torque, in each case the rotational speed of a shaft driven by the drive aggregate 2 is determined. In the sole drawing this shaft is the output shaft of the drive aggregate 2, with which a rotational speed sensor 10 is associated.

From the difference of the rotational speeds determined at the defined time-points and from the time intervals between the defined time-points, an angular acceleration of the shaft is obtained by forming a quotient, and from this angular acceleration when the power take-off 8 is coupled to the drive aggregate 2 a first torque of the shaft driven by the drive aggregate 2, whose rotational speed is detected by means of the rotational speed sensor 10, is determined.

In this case the first torque is determined as follows:

$$M_1 = J * \alpha_1$$

in which $M_1$ is the first torque of the shaft,
J is the mass moment of inertia,
$\alpha_1$ is the angular acceleration of the shaft when the power take-off 8 is coupled to the drive aggregate 2.

The mass moment of inertia J depends on the mass moment of inertia of the transmission 4 relative to the input 4A of the transmission 4, and is known on the control side.

As a function of the first torque, the torque taken up by the power take-off 8 is determined.

Preferably, the above-mentioned defined torque is also delivered by the drive aggregate 2 when the power take-off 8 is decoupled from the drive aggregate 2, and in this case too rotational speeds of the shaft are detected at the defined time-points after the beginning of the delivery of the torque by the drive aggregate 2, in order, as a function of the rotational speeds and time-points, to determine an angular acceleration of the shaft whose rotational speed is being monitored as well when the power take-off 8 is decoupled.

From the angular acceleration when the power take-off 8 is decoupled from the drive aggregate 2 a second torque of the shaft driven by the drive aggregate 2 is determined. This second torque is preferably determined as follows:

$$M_2 = J * \alpha_2$$

in which $M_2$ is the second torque,
J is the mass moment of inertia,
and $\alpha_2$ is the angular acceleration when the power take-off 8 is decoupled from the drive aggregate.

As a function of the above first torque determined on the basis of the angular acceleration of the monitored shaft when the power take-off 8 is coupled to the drive aggregate 2 and the above-mentioned second torque determined on the basis of the angular acceleration of the monitored shaft when the power take-off 8 is decoupled from drive aggregate 2, the torque taken up by the power take-off 8 is then determined, namely by calculating a difference.

The torque taken up by the power take-off 8, determined in the above manner, is stored and used for carrying out shifts or gear changes in the transmission 4, in order to carry out shifts or gear changes with a high level of comfort.

When, as shown in the sole drawing, the drivetrain 1 comprises a hydrodynamic starting element 5, then during execution of the method the converter lock-up clutch 7 is or remains fully closed so that it does not slip. Consequently, the power take-off 8 that can be coupled on the drive aggregate side can also be arranged between the hydrodynamic starting element 5 and the transmission 4 and can be coupled to or decoupled from an input shaft of the transmission 4 by means of the clutch 9. When the converter lock-up clutch 7 is fully closed, the power take-off 8 is thereby either coupled to the drive aggregate 2 or decoupled from the drive aggregate 2, depending on the position of the clutch 9. Consequently, the method according to the invention can also be carried out with such an arrangement of the power take-off 8.

Alternatively, the torque taken up by the power take-off can be determined from the difference between the motor torque delivered by the drive aggregate and the first torque. The motor torque delivered by the drive aggregate is known on the control side.

The invention further relates to a control unit 11 for carrying out the method according to the invention. The control unit 11 is designed to carry out the method described above by control means. For this, the control unit 11 comprises hardware and software means. The hardware means include data interfaces for the exchange of data with the assemblies involved in carrying out the method according to the invention. In addition, the hardware means include a memory for data storage and a processor for data processing. The software means include program modules which are implemented in the control unit for carrying out the method according to the invention.

The control unit 11 shifts the transmission 4 by control means, either indirectly by way of another control unit or directly, to a condition in which relative to the output 4B the transmission 4 is torque-interrupted, so that at the output 4B and hence at the drive output 3 no torque can be transmitted. Preferably, in this condition, relative to the input 4A, the transmission 4 has as large a mass moment of inertia as possible.

Thereafter, the control unit 11 calls for a defined torque from the drive aggregate 2, namely at least when the power take-off 8 is coupled to the drive aggregate 2 and preferably also when the power take-off 8 is decoupled from the drive aggregate 2.

At defined time-points after the beginning of the delivery of the defined torque by the drive aggregate 2, the control unit receives from the rotational speed sensor 10 rotational speeds of a shaft driven by the drive aggregate 2 and from those rotational speeds determines in each case an angular acceleration, namely an angular acceleration with the power take-off 8 coupled to the drive aggregate 2 and preferably also with the power take-off 8 decoupled from the drive aggregate 2.

On the basis of these angular accelerations, torques are determined, namely a first torque when the power take-off 8 is coupled to, and preferably also a second torque when the power take-off 8 is decoupled from the drive aggregate 2. As a function of these torques, the torque taken up by the power take-off 8 is determined.

INDEXES

1 Drivetrain
2 Drive aggregate
3 Drive output
4 Transmission
4A Input
4B Output
5 Starting element
6 Converter
7 Converter lock-up clutch
8 Power take-off
9 Clutch
10 Rotational speed sensor
11 Control unit

The invention claimed is:

1. A method of operating a drivetrain of a motor vehicle, the drivetrain having a drive aggregate, a transmission connected between the drive aggregate and a drive output, a power take-off that is coupleable to the drive aggregate on a drive aggregate side in order to take up drive torque delivered by the drive aggregate, the method comprising:
   determining a torque taken up by the power take-off by:
      first shifting the transmission to a condition in which, relative to an output thereof, the transmission is torque-interrupted,
      then delivering a defined torque by the drive aggregate when the power take-off is coupled to the drive aggregate, and, during this at defined points in time, determining rotational speeds of a shaft driven by the drive aggregate, and determining an angular acceleration of the shaft from the rotational speeds,
   determining a first torque of the shaft from the angular acceleration with the power take-off coupled to the drive aggregate, and
   as a function of the first torque, determining the torque taken up by the power take-off,
   delivering the defined torque also by the drive aggregate when the power take-off is decoupled therefrom, and determining the angular acceleration of the shaft when the power take-off is decoupled,
   determining a second torque of the shaft driven by the drive aggregate from the angular acceleration when the power take-off is decoupled from the drive aggregate, and
   determining the torque taken up by the power take-off based on the first and the second torque of the shaft.

2. The method according to claim 1, further comprising determining the first torque of the shaft as follows:

$$M_1 = J * \alpha_1$$

in which $M_1$ is the first torque of the shaft,
J is the mass moment of inertia, and
$\alpha_1$ is the angular acceleration of the shaft when the power take-off is coupled to the drive aggregate.

3. The method according to claim 1, further comprising determining the second torque of the shaft as follows:

$$M_2 = J * \alpha_2$$

in which $M_2$ is the second torque of the shaft,
J is the mass moment of inertia, and
$\alpha_2$ is the angular acceleration of the shaft when the power take-off is decoupled from the drive aggregate.

4. The method according to claim 1, further comprising determining the torque taken up by the power take-off from the difference between the second torque and the first torque.

5. The method according to claim 1, further comprising carrying out shifts in the transmission as a function of the torque taken up by the power take-off.

6. The method according to claim 1, further comprising shifting the transmission to a condition in which, relative to an input of the transmission, a mass moment of inertia of the transmission is as large as possible and in which, relative to the output of the transmission, the transmission is torque-interrupted.

7. The method according to claim 1,
   wherein the drivetrain having a starting element with a converter and a converter lock-up clutch connected parallel to the converter, the converter lock-up clutch being engagable.

8. A control unit for operating a drivetrain of a motor vehicle, wherein the control unit, for a determination of a torque taken up by a power take-off:
   first shifts a transmission by control means into a condition in which, relative to an input of the transmission, a mass moment of inertia of the transmission is as large as possible and in which, relative to an output thereof, the transmission is torque-interrupted,
   then calls for a defined torque from a drive aggregate, when the power take-off is coupled to the drive aggregate, and
   at defined time-points during this the control unit receives rotational speeds of a shaft driven by the drive aggregate and, from the rotational speeds of the shaft driven, determines an angular acceleration of the shaft,
   the control unit determines, from the angular acceleration with the power take-off coupled to the drive aggregate, a first torque of the shaft, and
   the control unit determines, as a function of the first torque of the shaft, the torque taken up by the power take-off.

9. The control unit according to claim 8, wherein the control unit is designed to carry out a method for operating the drivetrain of the motor vehicle, the drivetrain having the drive aggregate, the transmission connected between the drive aggregate and a drive output, the power take-off that is coupleable to the drive aggregate on a drive aggregate side in order to take up drive torque delivered by the drive aggregate.

10. A method for operating a motor vehicle drivetrain having a drive aggregate, a transmission connected between the drive aggregate and a drive output, a power take-off that is coupleable to the drive aggregate on the drive aggregate side in order to take up drive torque delivered by the drive aggregate, the method comprising:
- first shifting the transmission to a condition in which, relative to an input of the transmission, a mass moment of inertia of the transmission is as large as possible and in which, relative to a transmission output, the transmission is torque-interrupted,
- then delivering a defined torque by the drive aggregate at least when the power take-off is coupled to the drive aggregate, and during this, at defined points in time, determining rotational speeds of a shaft driven by the drive aggregate, and determining an angular acceleration of the shaft from the determined rotational speeds,
- determining a first torque of the shaft from the angular acceleration with the power take-off coupled to the drive aggregate, and
- determining a torque taken up by the power take-off as a function of the first torque.

\* \* \* \* \*